US008239055B2

(12) United States Patent
Grove et al.

(10) Patent No.: US 8,239,055 B2
(45) Date of Patent: Aug. 7, 2012

(54) SYSTEM FOR MAINTAINING UNIFIED ACCESS TO SCADA AND MANUFACTURING EXECUTION SYSTEM (MES) INFORMATION

(75) Inventors: Eric Paul Grove, Dallastown, PA (US); Steven M. Weinrich, York, PA (US); Christopher Justin Miller, York, PA (US)

(73) Assignee: Invensys Systems, Inc., Foxboro, MA (US)

(*) Notice: Subject to any disclaimer, the term of this patent is extended or adjusted under 35 U.S.C. 154(b) by 475 days.

(21) Appl. No.: 12/435,380

(22) Filed: May 4, 2009

(65) Prior Publication Data
US 2009/0276072 A1    Nov. 5, 2009

Related U.S. Application Data

(60) Provisional application No. 61/050,175, filed on May 2, 2008.

(51) Int. Cl.
G06F 19/00 (2006.01)
G06F 7/00 (2006.01)
G06F 9/44 (2006.01)
G05B 9/02 (2006.01)

(52) U.S. Cl. ............ 700/108; 700/80; 700/95; 700/104; 717/105; 717/109; 717/113; 707/755

(58) Field of Classification Search ............... 700/90, 700/96, 100–104, 108; 717/100, 105, 109, 717/113, 125; 719/328; 707/755–756
See application file for complete search history.

(56) References Cited

U.S. PATENT DOCUMENTS

| 5,664,180 | A | 9/1997 | Halpert et al. | |
|---|---|---|---|---|
| 7,086,009 | B2 * | 8/2006 | Resnick et al. | 715/771 |
| 7,543,276 | B2 * | 6/2009 | Pfander et al. | 717/125 |
| 7,778,717 | B2 * | 8/2010 | Bachman et al. | 700/83 |
| 8,117,300 | B2 * | 2/2012 | Weinrich et al. | 709/224 |
| 8,127,132 | B2 * | 2/2012 | Andersson et al. | 713/167 |
| 2002/0198920 | A1 | 12/2002 | Resnick et al. | |
| 2003/0200130 | A1 * | 10/2003 | Kall et al. | 705/8 |
| 2004/0201602 | A1 * | 10/2004 | Mody et al. | 345/700 |
| 2005/0038579 | A1 | 2/2005 | Lewis | |
| 2005/0044532 | A1 * | 2/2005 | Pfander et al. | 717/124 |

(Continued)

OTHER PUBLICATIONS

International Search Report and Written Opinion of PCT/US 09/42755 dated Jun. 25, 2009.

*Primary Examiner* — Sean Shechtman
*Assistant Examiner* — Darrin Dunn
(74) *Attorney, Agent, or Firm* — Edward S. Jarmolowicz, Esq.

(57) ABSTRACT

A system is disclosed that simplifies configuring an MES entity corresponding to a SCADA system object representing plant equipment. The system includes an equipment model builder (EMB) that receives a set of configured UCO information for a modeled piece of plant equipment in a SCADA system. The EMB extracts relevant MES information from the utilization capability object and invokes an application interface on an MES database to create a corresponding entity (e.g., a database element). Another aspect of the disclosed system and methods involves the enhancement of a SCADA system object, through a new MES facet, to support acquiring and reporting equipment status received via the SCADA system to a corresponding MES entity. A raw reason code configuration interface is provided by UCO configurator computer software executed on a computer. Each raw reason code is associated with a prioritized logical expression defining circumstances under which the reason code becomes true.

11 Claims, 11 Drawing Sheets

U.S. PATENT DOCUMENTS

| | | |
|---|---|---|
| 2005/0108265 A1* | 5/2005 | Langkafel et al. ............ 707/101 |
| 2005/0216579 A1* | 9/2005 | Yang et al. .................... 709/223 |
| 2006/0056285 A1 | 3/2006 | Krajewski et al. |
| 2006/0271233 A1* | 11/2006 | Liang et al. .................. 700/178 |
| 2008/0009959 A1* | 1/2008 | Enright et al. .................. 700/96 |
| 2008/0154393 A1* | 6/2008 | Reshef ........................... 700/65 |
| 2009/0228129 A1* | 9/2009 | Moyne et al. ................. 700/102 |

* cited by examiner

221
- 222 Work Order
- 223 Item Class
- 224 Item
- 225 Item Unit of Measure
- 226 Operation
- 227 Required Quantity
- 228 Start Quantity
- 229 Batch Size
- 230 Target Job Production Rate
- 231 Target Job Production Rate Units
- 232 Operator
- Start Job On Deploy

FIG. 2C

241
- 242 Item Reason
- 243 Update Interval Delay
- 244 Deadband
- Maximum Value (before rollover)

FIG. 2D

| 900 | |
|---|---|
| 901 | Equipment Status Attributes (See FIG. 2B) |
| 902 | Production Attributes (See FIG. 2C) |
| 904 | Add Production Quantity |
| 906 | Add Production Quantity Counter |
| 908 | Counter Attributes (See FIG. 2D) |
| 910 | Current Performance/Production Values |
| 912 | Raw Reason Code |
| 914 | Raw Reason Code Default Reason |
| 916 | Raw Reason Code Delay |
| 918 | Raw Reason Code Time Entered |
| 920 | Time in Raw Reason Code |
| 922 | Raw Reason Code Description |
| 923 | Spare Attributes (Context) |
| 924 | Previous Raw Reason Code |
| 926 | Status |
| | Reset |

FIG. 9

SYSTEM FOR MAINTAINING UNIFIED ACCESS TO SCADA AND MANUFACTURING EXECUTION SYSTEM (MES) INFORMATION

CROSS-REFERENCE TO RELATED APPLICATION

This application claims the priority benefit of Grove et al., U.S. Provisional Patent Application Ser. No. 61/050,175, filed on May 2, 2008, the contents of which are incorporated herein by reference in their entirety, including the contents of any references contained therein.

TECHNICAL FIELD

The present invention generally relates to the field of networked computerized systems utilized to monitor (and log relevant production events) and/or exert supervisory control over industrial/manufacturing processes and systems. More particularly, the present invention relates to supervisory process control (SCADA) and manufacturing execution (MES) systems. Such systems generally execute above/outside of a control layer of a manufacturing/process control system to provide guidance to lower level control elements such as, by way of example, programmable logic controllers.

BACKGROUND

Industry increasingly depends upon highly automated data acquisition and control systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-stage process within an industrial plant. These sensors are of varied type and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. An example of such system is the well-known Wonderware INTOUCH® human-machine interface (HMI) software system for visualizing and controlling a wide variety of industrial processes. An INTOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a steam of data supplied by a tank level sensor indicative of the liquid level within the tank. Animated graphical images driven by constantly changing process data values within data streams, of which the tank level indicator is only one example, are considerably easier for a human observer to comprehend than a steam of numbers. For this reason process visualization systems, such as INTOUCH, have become essential components of supervisory process control and manufacturing information systems.

An exemplary environment within which a unified equipment model for supervisory control and data acquisition (SCADA) and manufacturing execution system (MES) is implemented is described, for example in Krajewski, III, et al. U.S. application Ser. No. 10/943,301 which corresponds to US App. Pub. 2006/0056285 A1, the contents of which are incorporated herein by reference in their entirety, including any references contained therein. The MES is, by way of example, the FACTELLIGENCE MES product of Invensys, Systems, Inc. which is another primary component of an illustrative environment within which unified model is employed. The MES differs from the SCADA component in that it is not generally used to exert supervisory control over a plant/manufacturing process. Instead, the MES monitors production and records various production/manufacturing events and applies known business rules to render decisions governing production operations carried out by the SCADA system. MES systems interface to higher level enterprise resource planning (ERP) systems.

SUMMARY OF THE INVENTION

The disclosed system and methods address a potential need to provide better ways of sharing and synchronizing plant equipment and process data associated with SCADA systems with manufacturing execution systems. The disclosed embodiments simplify configuration of an MES based upon application objects within an associated SCADA system and facilitate updating MES entities via the SCADA system objects at runtime.

A system and method is provided for updating a manufacturing execution system database to include an MES entity corresponding to equipment modeled by a corresponding SCADA system object. The system is configured via software to provide a utilization object associated with the SCADA system object. The utilization object includes an executable that, when executed, applies collected status data for the SCADA system object to a set of configured logical expressions to render a current raw reason code for the utilization object. The system also supports the further step of extracting MES entity configuration information from the utilization object. Moreover the system supports invoking an interface functionality on the MES database to create the MES entity. The discloses system also provides a link between the utilization object and the MES entity to facilitate updating the MES entity based upon an event triggered by a change to the current raw reason code for the utilization object.

A system and method are also provided for updating an MES database including an MES entity corresponding to equipment modeled by a corresponding SCADA system object. The system is configured via software to provide a utilization object associated with the SCADA system object. The utilization object includes an executable that, when executed, applies collected status data for the SCADA system object to a set of configured logical expressions to render a current raw reason code for the utilization object. The system also supports the further step of issuing to the MES database an update from the utilization object when the result of applying collected status data to the set of configured logical expressions indicates that the current raw reason code has changed to a new value.

A system and method are also provided for configuring a utilization object corresponding to equipment modeled by a SCADA system object. The utilization object is used thereafter by the system at runtime to determine equipment states for provision to an MES database entity. The system is configured via software to provide a configurable utilization object associated with the SCADA system object. The configurable utilization object includes an executable that, when executed, applies collected status data for the SCADA system object to a set of logical expressions associated with a set of raw reason codes to render a current raw reason code for the utilization object. The system also supports providing a utilization object equipment state configuration interface. The equipment state configuration interface comprises a user-editable fields through which the set of raw reason codes and associated expressions are defined for the configurable utilization object. The user-editable fields include a raw reason code list for presenting the set of raw reason codes according to their relative serialized priorities.

The method steps, carried out by the disclosed system, are generally embodied in computer-executable instructions stored on physical computer readable media.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIGS. 2A, 2B, 2C, 2D identify sets of configurable attributes of an exemplary utilization capability object (UCO) structure;

FIG. 9 identifies information associated with a runtime UCO that facilitate passing equipment status (raw reason codes), production attributes, and production counter information to a corresponding MES entity.

DETAILED DESCRIPTION OF THE DRAWINGS

Figure 1:
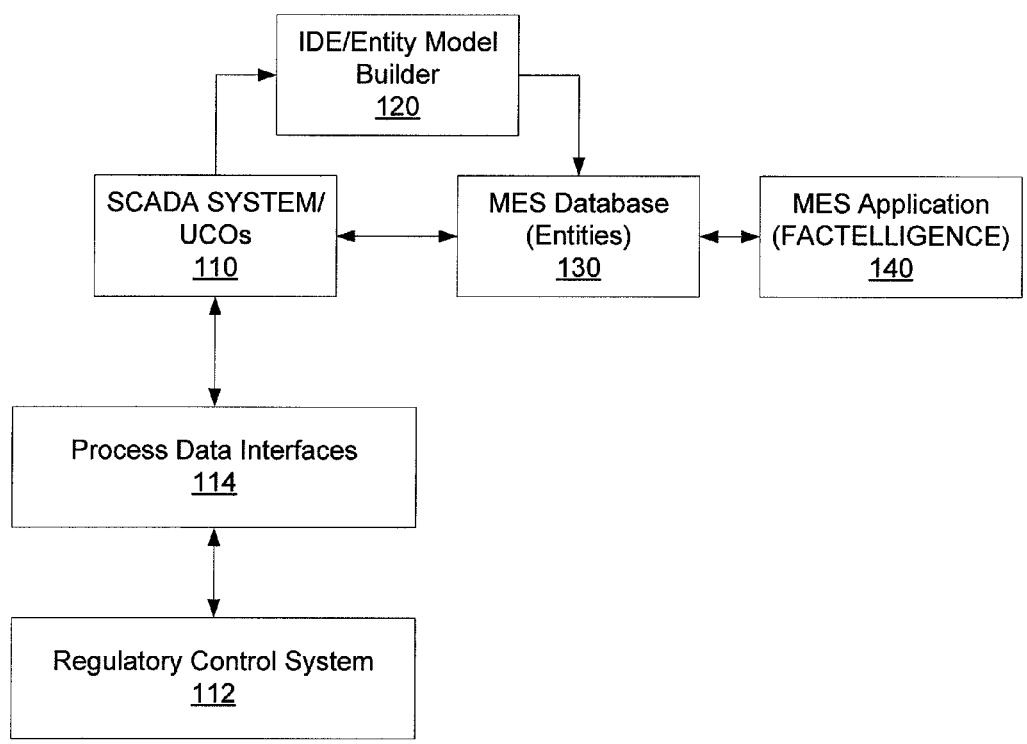
FIG. 1 is a schematic diagram depicting the combined SCADA and MES environment wherein utilization capability objects (UCOs) on a SCADA system node communicate state changes to an MES database to synchronize the SCADA and MES models for plant equipment.

A new application object for a SCADA system is described that allows users to extend equipment objects of the SCADA system with utilization capability. Once an equipment and utilization model for plant equipment is defined in a SCADA configuration environment, the configured attributes of the equipment and utilization model drives the creation of a new MES entity (i.e., database element) that embodies the modeled equipment in an MES environment. An exemplary combined SCADA/MES environment is depicted in FIG. 1 that incorporates the Invensys ARCHESTRA® operating environment wherein application objects are hosted by application engines, and the application engines are hosted by platforms in a multi-level hosting arrangement. Such environment is disclosed, by way of example, in Krajewski, III, et al. U.S. application Ser. No. 10/943,301 which corresponds to US App. Pub. 2006/0056285 A1, and Resnick et al. U.S. application Ser. No. 10/179,668, filed on Jun. 24, 2002, the contents of each application are incorporated herein by reference in their entirety, including any references contained therein.

The exemplary SCADA/MES environment schematically depicted in FIG. 1 comprises a SCADA portion that includes a set of utilization capability objects (UCOs) 110. Configurable attributes of the UCOs 110, described in detail with reference to FIGS. 2A-D, support representing corresponding plant equipment (e.g., a mixer) utilization/operation. The attributes of each of the UCOs 110, by way of example, include a set of specified reason codes associated with various corresponding equipment states (e.g., running, paused, down, etc.). The set of reason codes for a piece of equipment corresponding to a UCO includes a default reason (state) along with a set of allowable final reasons (states) for the equipment.

In the illustrative example, an entity model builder 120 reads the set of configured attributes contained within the UCO for a particular piece of plant equipment to automatically generate a corresponding entity element in an MES database 130. At runtime, during cyclical processing of a UCO, a logical expression associated with each configured reason code in the UCO is evaluated to determine a currently active reason code (state) for corresponding plant equipment. A change in active reason code (state) of a UCO triggers an event and exposes related equipment performance information (contained in the UCO) for consumption by a corresponding entity in the MES database. Furthermore, the UCOs support micro-stops. The micro-stops are equipment states having a short duration. The micro-stops do not get full recognition as a regular state, and are instead accumulated and tracked separately from regular state (reason code) changes that are passed to the. In an exemplary embodiment, the UCOs leverage existing equipment status object primitives. The previously known portions of the UCO object will be known to those skilled in the art and are therefore not described herein.

The runtime process data generated by a regulatory control system 112 is received by the SCADA system 110 containing the UCOs through any combination of process data interfaces 114. As those skilled in the art will readily appreciate, the source of the process data is generally sensor data provided by field devices to regulatory control processors (via a variety of interfaces). The process data thereafter passes from the regulatory control system 112 to the SCADA system 110 via any of a variety of communications channels including gateways, integrators, and runtime process data storage applications (e.g., plant Historian database).

The illustrative unified SCADA/MES system includes the entity model builder 120. The entity model builder 120 creates entities in the MES database 130. The MES environment is one supported, for example, by the Factelligence software environment. The entity model builder 120 configures utilization entries in the MES database 130 based on utilization capability objects 110 in the SCADA system environment. The entity model builder 120, in an exemplary embodiment, is a utility, comprising computer-executable instructions, launched from an integrated design environment (IDE), such as the ARCHESTRA® IDE for configuring the SCADA system and its associated objects.

An MES application 140, such as INVENSYS SYSTEMS, INC. FACTELLIGENCE MES application, running on a plant monitoring application node in the unified SCADA/MES environment schematically depicted in FIG. 1, provides a series of views driven by the production/utilization information contained within the configured entities (elements) within the MES database 130. MES applications software systems provide a configurable facility for tracking the status (and thus utilization and availability) of plant equipment. Thus, instead of controlling the operation of plant equipment (the domain of SCADA system), MES applications capture and provide real-time, instantaneous plant/production information relating to the operational status of equipment within manufacturing process chains. MES applications thus facilitate tracking equipment utilization and improving/optimizing plant equipment utilization through efficient use of the plant equipment.

The entity model builder 120, when invoked to operate upon one more designated UCOs, initiates transferring data (see chart below) from UCOs representing plant/manufacturing equipment within the SCADA system to corresponding entries (database elements) within the MES database 130 to create corresponding MES entities. Table 1 below identifies information imported from the equipment model of the SCADA configuration.

TABLE 1

| SCADA System | MES System |
| --- | --- |
| Utilization Capability Object—Name | Entity Name not used |
| Hierarchical Parent | Entity Parent Entity Name |
| Utilization Capability Object—Allowable State Reasons | Entity Allowable Reasons |
| Utilization Capability Object—Performance Parameters | Entity Performance Parameters |

The MES entity model builder 120 moves the entire parentage-hierarchy (parents, grandparents, etc) of the various SCADA objects that are above the UCO, up to and including an Area Object containing the equipment object with which the UCO is associated. The MES entity model builder recreates the SCADA hierarchy of objects as hierarchical Entities in the MES database 130 (e.g., Factelligence database).

For example, if the following object hierarchy exists in the SCADA system:

+AreaA
|
+---+AppObject1
|
+---+UtilCapObject3
   |
   +--SomeOtherObject_001

The entity model builder 120 reads the hierarchically linked objects, and then creates the following corresponding MES database 130 entities (elements):

+AreaA
|
+---+AppObject1

An entity corresponding to the SomeOtherObject_001 object, from the SCADA system, was not created in the MES database 130.

The UCO and the entity model builder 120 extend the functionality of an ARCHESTRA IDE equipment SCADA model to support machine performance monitoring via the MES application 140. UCO instances associated with equipment objects in a SCADA environment enable mapping the SCADA equipment object to a corresponding MES entity (auto-generated from a UCO instance associated with the SCADA equipment object) that supports monitoring of the operation and usage of corresponding physical plant equipment.

The entity model builder 120 uses the information configured in the UCO to automatically configure entities within the MES database 130 used by the MES (Factelligence) application. After the UCO instance is deployed in the SCADA environment and the entity model builder 120 has created a corresponding entity in the MES database 130, the MES application 140 is capable of monitoring machine performance and logging utilization events on the MES entity associated with the deployed UCO instance (via updates to the MES entities from information provided by the UCO instance). The UCOs also support setting production attributes and adding production for jobs running on associated entities.

The description of an exemplary system environment and the general functionality of particular components, with reference to FIG. 1, is based on illustrative embodiments and should not be taken as limiting the invention with regard to alternative embodiments that are not explicitly described herein. By way of example, the illustrative combined MES and supervisory process control and manufacturing information environment (e.g., one including a SCADA system) is one wherein individual pieces of process/plant equipment are represented by application objects. An example of such a SCADA system is described in detail in Resnick et al., U.S. application Ser. No. 10/179,668 filed on Jun. 24, 2002, for SUPERVISORY PROCESS CONTROL AND MANUFACTURING INFORMATION SYSTEM APPLICATION HAVING A LAYERED ARCHITECTURE, the contents of which are incorporated herein by reference in their entirety including the contents and teachings of any references identified/contained therein. However, as those skilled in the art will appreciate in view of the disclosed exemplary embodiments, the present invention is potentially applicable to a variety of alternative environments that include identifiable data sources that provide real-time process data corresponding to an observed/controlled industrial process and an associated MES.

Figure 2A:
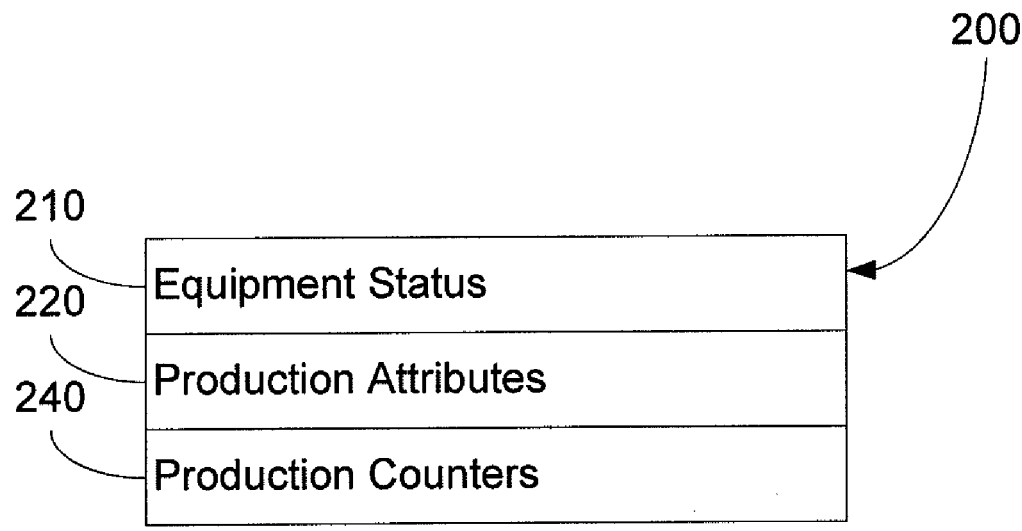

Having described an exemplary linked SCADA/MES environment wherein UCOs representing plant equipment act as sources of information for corresponding MES entities, attention is directed to a description of the content (and function) of an exemplary embodiment of the UCO of the SCADA system. Turning to FIG. 2A, the exemplary UCO 200 comprises: an equipment status primitive 210, a production attributes primitive 220, and a production counters primitive 240. It should be understand that the primitives, as referred to herein, include both identified data (structures) and associated executable program code, stored on physical computer-readable media, for carrying out described processes that evaluate and transform the identified data.

The equipment status primitive 210 generally contains all the relevant information needed by a corresponding MES plant equipment entity (MES database 130 element) to monitor and record utilization events associated with a piece of plant equipment. The production attributes primitive 220 generally contains all the relevant information needed to record production attribute data monitored/recorded by the UCO 200. The production counters primitive 240 generally contains all the relevant information needed to maintain a set of production counters associated with a piece of modeled plant equipment. The user-configurable information associated with the equipment status primitive 210, the production attributes primitive 220 and the production counters primitive 240 are described herein below with reference to FIGS. 2B, 2C and 2D.

Figure 2B:
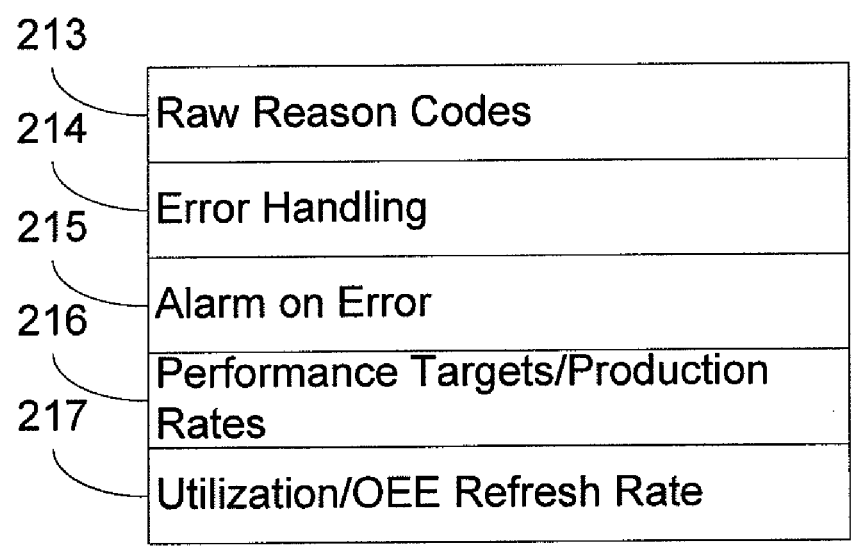

Turning to FIG. 2B, configurable information associated with the equipment status primitive 210 are identified. A RawReasonCodes 213 comprises a list of defined equipment reason codes (states) supported by the UCO object. The RawReasonCodes 213 is a configuration time attribute containing a listing of a set of prioritized reason codes (states) for the corresponding MES entity. In the exemplary embodiment, the priority of a particular reason code is determined by its position in the list of reason codes listed in the RawReasonCodes 213. An exemplary user interface for defining the contents of the RawReasonCodes 213 is provided in FIG. 3.

In the illustrative example, the set of currently configured reason codes is presented in a reason codes list box 310. In the exemplary embodiment, a user adds new reason codes by selecting the "+" button above the reason codes list box 310 to add and edit a new raw reason code. Existing reason codes are removed by selecting the "x" marked delete button. Reason codes are assigned priority based upon their position within the serialized list of reason codes for a UCO. In the illustrative embodiment, the priority of a reason code is reflected by its position within the list box 310 (the top of the list having the highest priority). A reason code priority is moved up/down within the list by selecting a particular reason code in the list box 310 and then selecting the up/down button above the list box 310 to raise/lower the priority of the selected reason code.

Figure 3:
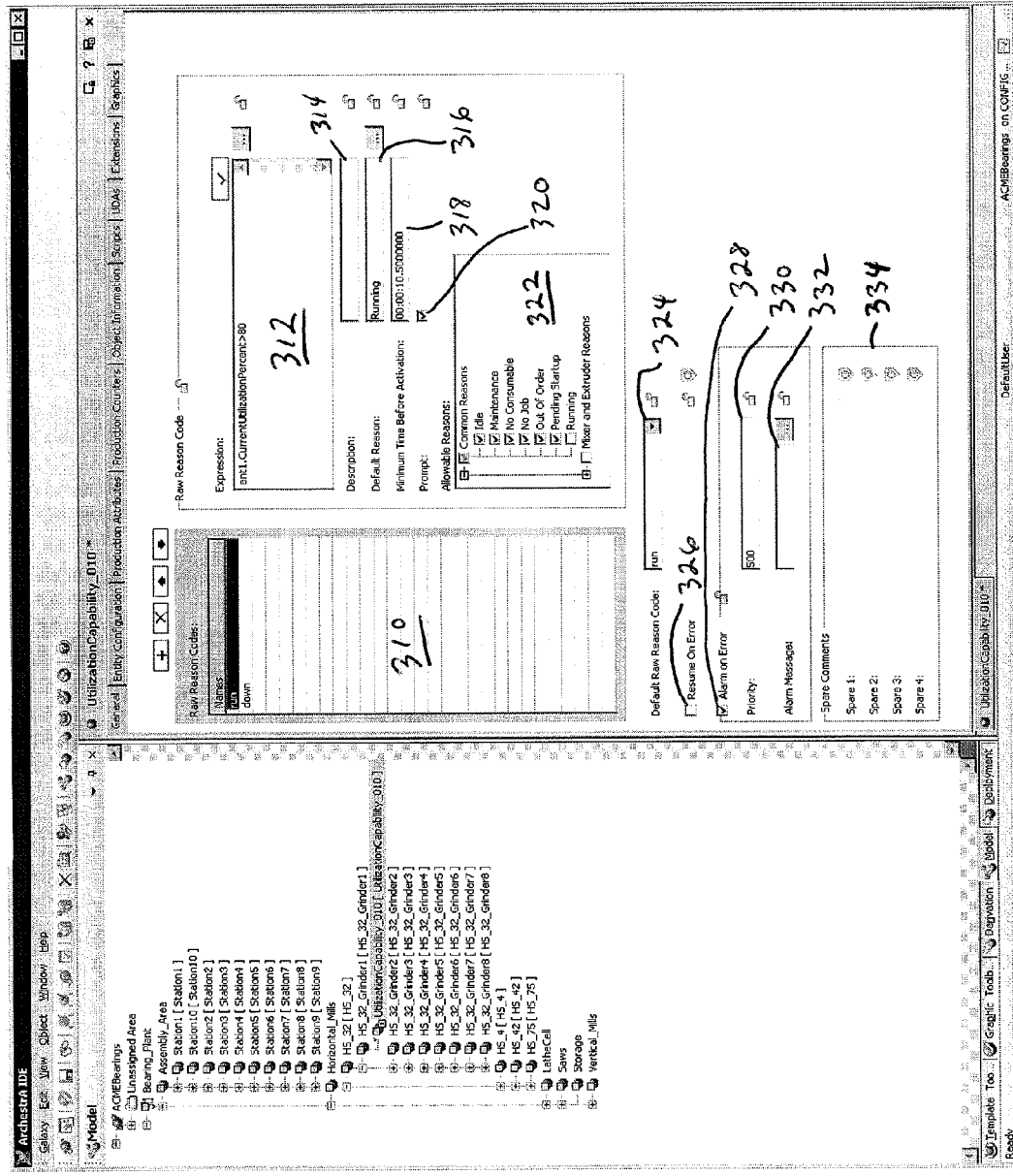
FIG. 3 is an exemplary graphical user interface for a UCO configuration utility executing on a computer that facilitates configuration of raw reason codes for a UCO.

The various user selected/filled fields in the exemplary configuration user interface of FIG. 3 are described herein below.

Each raw reason code in the RawReasonCodes 213 includes, by way of example, the fields provided herein below.

Expression: a logical expression entered by a user within an expression text box 312 which, when evaluated in view of current parameter values, determines whether the raw reason code evaluates to True for a particular evaluation pass.

Description: a text description entered by a user within a description text box 314 which describes the raw reason code (equipment state) associated with a True evaluation of the expression in the expression text box 312.

Default Reason: a default reason entered by a user within a default reason text box 316. This is the text selected automatically when the expression for the reason code evaluates to True. In an exemplary embodiment the default reason is selected from a set of allowable reasons contained in a reason group tree within the MES database 130.

Minimum Time Before Activation: time duration value entered via the box 318 stored a period of time in, for example, hours:minutes:seconds.microsecond (or any relevant fraction) format representing the time the particular reason code must evaluate to True before it is identified as being a candidate for being active.

Prompt: a control enabled via a checkbox 320 that, when selected, causes the system to prompt an MES application user to select a reason from a list of allowable reasons listed in allowable reasons box 322 when the raw reason code becomes active.

Allowable Reasons: Allowable reasons, presented in box 322 are presented to a user from the MES database 130. A user of the MES application will be prompted to select one of the listed allowable reasons if the prompt control has been selected via the checkbox 320 and the reason code is designated as active.

Default Raw Reason Code: A reason code, selected from a drop-down list box control 324 (having entries corresponding to the set of reason codes displayed in the list box 310) during configuration of a UCO, that is assigned to the UCO (and corresponding MES entity in the MES database 130) when the status of the equipment is indeterminate. The default raw reason code is used to indicate that no raw reason code can be determined from the expressions (all evaluate to false or in the case of a true expression the raw reason code's minimum activation time has not elapsed.

A resume on error 214 functionality, enabled via a checkbox 326 on the exemplary UCO configuration user interface in FIG. 3, allows expression evaluation errors (e.g., bad data quality causes an expression to fail) to be ignored while the UCO is processed to determine a currently active raw reason code at runtime. If the resume on error 214 functionality is disabled, then expression errors (due to data quality issues, etc.) will stop the raw reason code evaluation (assuming no higher priority expression evaluated to True) and the default raw reason code is made active.

An alarm on error 215 functionality, enabled via a checkbox 328 on the exemplary UCO configuration user interface in FIG. 3, allows alarms to be generated for propagation to the MES database 130. Examples of possible errors include: expression errors, client session errors, utilization event errors, entity naming errors, OEE and utilization value errors. The error functionality also supports designation of a priority to errors generated by the UCO. A user designates the priority via numerical input box 330. An alarm message text box 332 facilitates user configuration of a text message for the alarm.

The exemplary UCO configuration user interface (General Tab), depicted by way of example in FIG. 3, also supports entry of 4 spare comments via text entry boxes 334. The spare comments provide additional context when logging utilization events at runtime (in response to a new active reason code). Furthermore, the UCO configuration interface supports designating a security classification for each individual spare comment.

Figure 4:
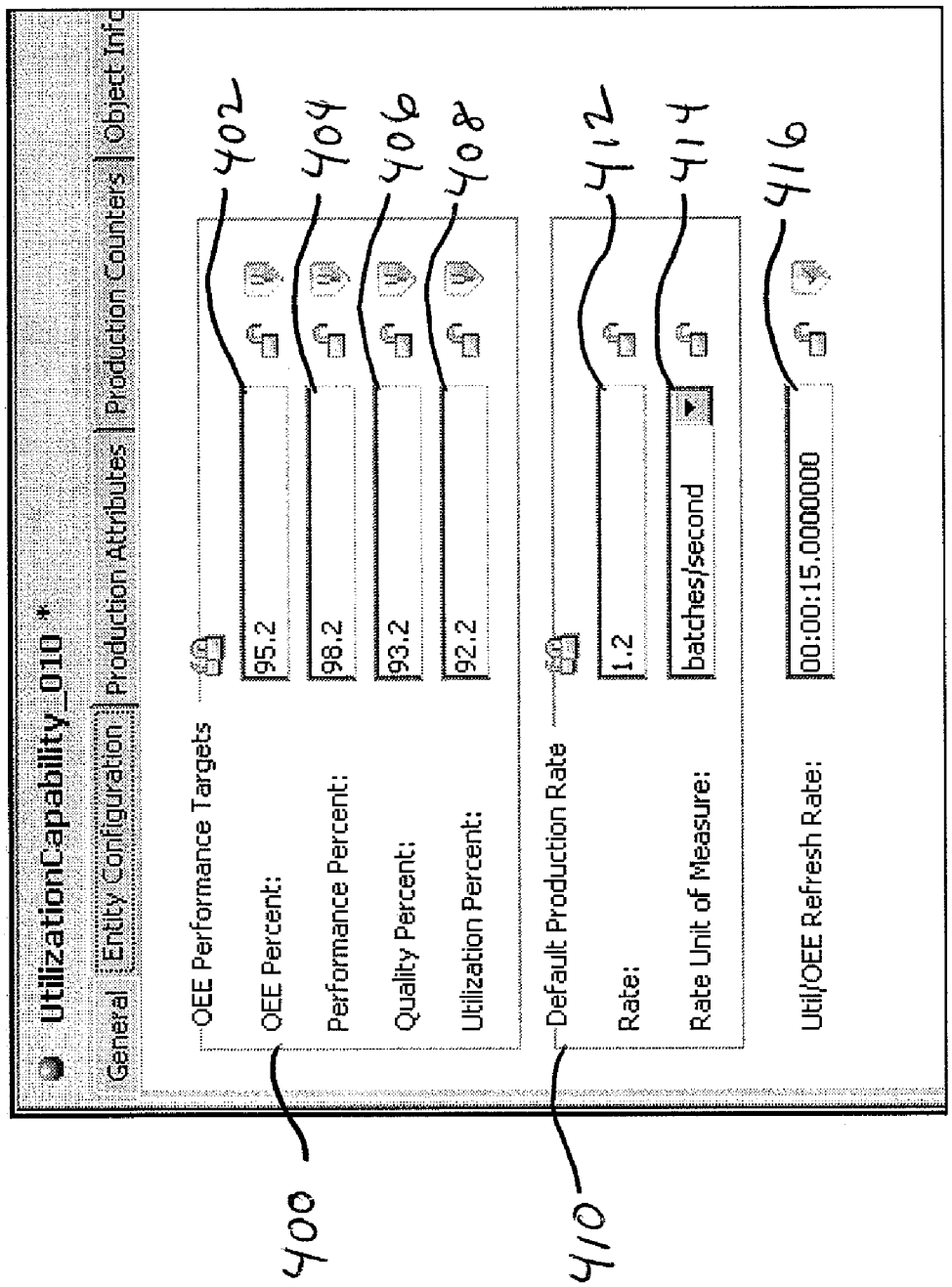
FIG. 4 is an exemplary GUI for a UCO configuration utility executing on a computer that facilitates configuration of an MES entity corresponding to a UCO.

Performance targets and production rates part 216 of the UCO relate to a set of user-configurable parameters defining performance targets and production rates for an MES entity (created by the entity model builder 120) corresponding to the UCO. Attention is directed to FIG. 4, depicting an exemplary user interface for configuring portions of the UCO relating to performance targets and production rates. The performance targets and production rate information is used by the MES application 140 at runtime to calculate an overall equipment effectiveness (OEE) value for the MES entity.

With continued reference to FIG. 4, an OEE Performance Targets portion 400 of the entity configuration user interface includes an OEE Percent input box 402 that supports specifying a target OEE percent value that is thereafter used by the MES application 140 to display target OEE against runtime OEE percentages. A Performance Percent box 404 supports specifying a target performance percent value that is thereafter used by the MES application 140 to display the target performance percent of the entity (plant equipment) against actual runtime performance percentages. A Quality Percent box 406 supports user-configuration of a target quality percent that is used at runtime by the MES application 140 to display the target quality percent against actual runtime quality percentages. A Utilization Percent box 408 supports user-configuration of a target utilization percent for equipment corresponding to the UCO (and later-built/linked MES entity). The value specified for the target utilization percent is used by the MES application 140 at runtime to display target utilization against runtime utilization percentages for equipment.

A Default Production Rate portion 410 of the entity configuration user interface includes a Rate input box 412 that supports specifying a default value, used in conjunction with a production rate unit of measure (specified through a Rate Unit of Measure drop-down list box 414, to calculate utilization and performance for an associated MES entity. The value entered in the Rate input box 412 is thus unitless. In the illustrative user interface the rate unit of measure is confined to a previously established set of unit options including, for example: hours/batch (default), minutes/batch, seconds/batch, batches/hour, batches/minute, and batches/second. While the example provides a set of examples measured in batches, in alternative embodiments the rate is expressed in virtually any format including volume/mass flow rates, articles created, etc.

With continued reference to FIG. 2B, the exemplary UCO structure also includes a Utilization/OEE Refresh Rate 217 that specifies a rate, expressed as a time period, indicating how frequently the actual utilization and OEE data will be re-calculated in the UCO at runtime. The duration is specified, for example, in a time entry box 416 in hours, minutes, seconds, and/or fractions of a second.

Turning to FIG. 2C, configurable information associated with the production attributes primitive 220 are identified. The production attributes specify characteristics associated with running a job on an MES entity (plant equipment) corresponding to the UCO.

Each of the configurable fields of the production attributes primitive 220 are discussed herein below with reference to an exemplary production attributes configuration user interface 500 provided in FIG. 5. Before describing the configurable attributes themselves, the configuration user interface 500 functionality will be described. In the example configuration user interface provided in FIG. 5 the Production Attributes input user interface 500 enables users to configure production attributes for an MES entity represented by the configured UCO. Each production attribute is configured to receive a value from either an existing source (attribute of an ARCHESTRA object attribute) or by direct entry of a value in an input box. If the production attribute value is provided from a designated source, then the value is retrieved at runtime with each scan of the UCO object, and the retrieved value is written to the corresponding production attribute. Thus, a batch size can be updated even after a particular batch production run has commenced. An enable production attribute checkbox 502 is selected during configuration of the UCO to enable use of production attributes, on a corresponding MES entity, through the UCO.

Figure 5:
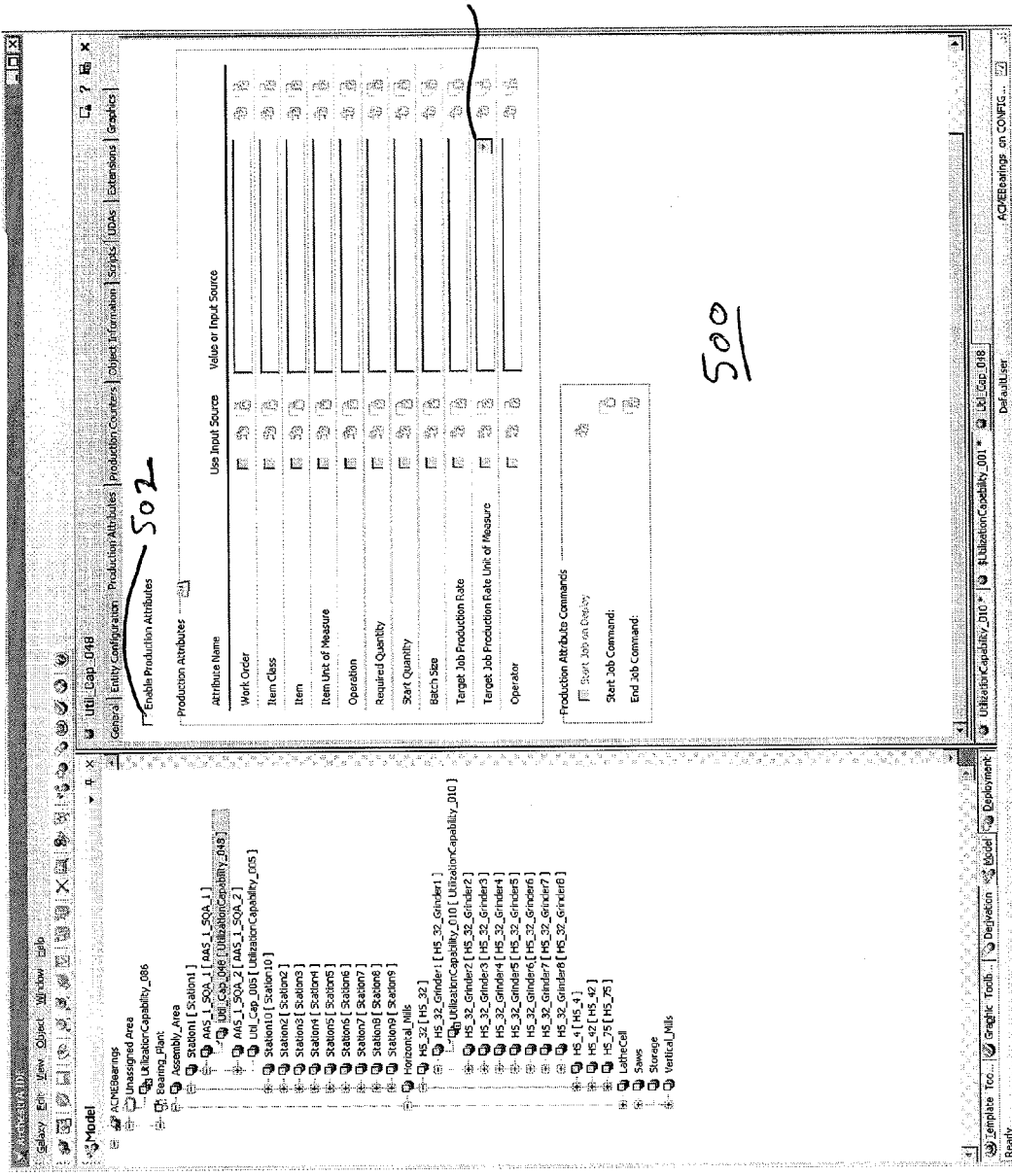
FIG. 5 is an exemplary graphical user interface for a UCO configuration utility executing on a computer that facilitates configuration of production attributes for a UCO.

With continued reference to FIG. 5, during configuration of a UCO, a user designates use of an input source (instead of a directly entered value) by selecting a "Use Input Source" checkbox corresponding to a particular production attribute. The exemplary production attribute configuration user interface supports specifying the following production attributes (described herein below): Batch Size, Item, Item Class, Item Unit of Measure, Operation, Operator, Required Quantity, Start Quantity, Target Job Production Rate, Target Job Production Rate Unit of Measure, and Work Order.

The user interface depicted in FIG. 5 also supports configuration of the UCO to start a job automatically upon deployment to an application engine host (in the exemplary ARCHESTRA SCADA environment). The user interface also includes a Start Job Command that is used to configure security for a start job command, and an End Job Command that is used to configure security for the end job command.

The following are brief descriptions of the production attributes listed in FIG. 2C and configured via the user interface depicted in FIG. 5.

A work order attribute 221 specifies a character string representing the work order associated with the MES entity corresponding to the UCO.

An item class attribute 222 specifies a character string representing the particular item class associated with the MES entity corresponding to the UCO.

An item attribute 223 specifies a character string representing the particular item associated with the MES entity corresponding to the UCO.

An item unit of measure attribute 224 specifies a character string representing the unit of measure for the value specified in the item attribute 223.

An operation attribute 225 specifies a character string representing an operation associated with the MES entity corresponding to the UCO.

A required quantity attribute 226 specifies a numeric value representing the required quantity (greater than zero) associated with the MES entity corresponding to the UCO.

A start quantity attribute 227 specifies a numeric value corresponding to a starting quantity associated with the MES entity corresponding to the UCO.

A batch size attribute 228 specifies a numeric value corresponding to the batch size (must be greater than zero) that is currently associated with the Entity.

A target job production rate attribute 229 specifies a numeric value representing the target production rate for a current job associated with the MES entity corresponding to the UCO.

A target job production rate units attribute 230 specifies a character string representing the units of measure associated with the value specified in the target job production rate attribute 229. In the exemplary embodiment, the production attributes configuration user interface 500 includes a drop-down list box 504 that contains an enumerated set of units from which a user selects a desired production rate unit.

An operator attribute 231 specifies a character string representing the operator associated with the MES entity corresponding to the UCO.

A start job on deploy attribute 232, containing a Boolean value of either true or false, specifies whether the UCO will be started immediately once deployed to a host application engine in the SCADA environment. When set to true, the UCO will automatically handle starting a new data entry job in association with a corresponding MES entity.

Figure 6:
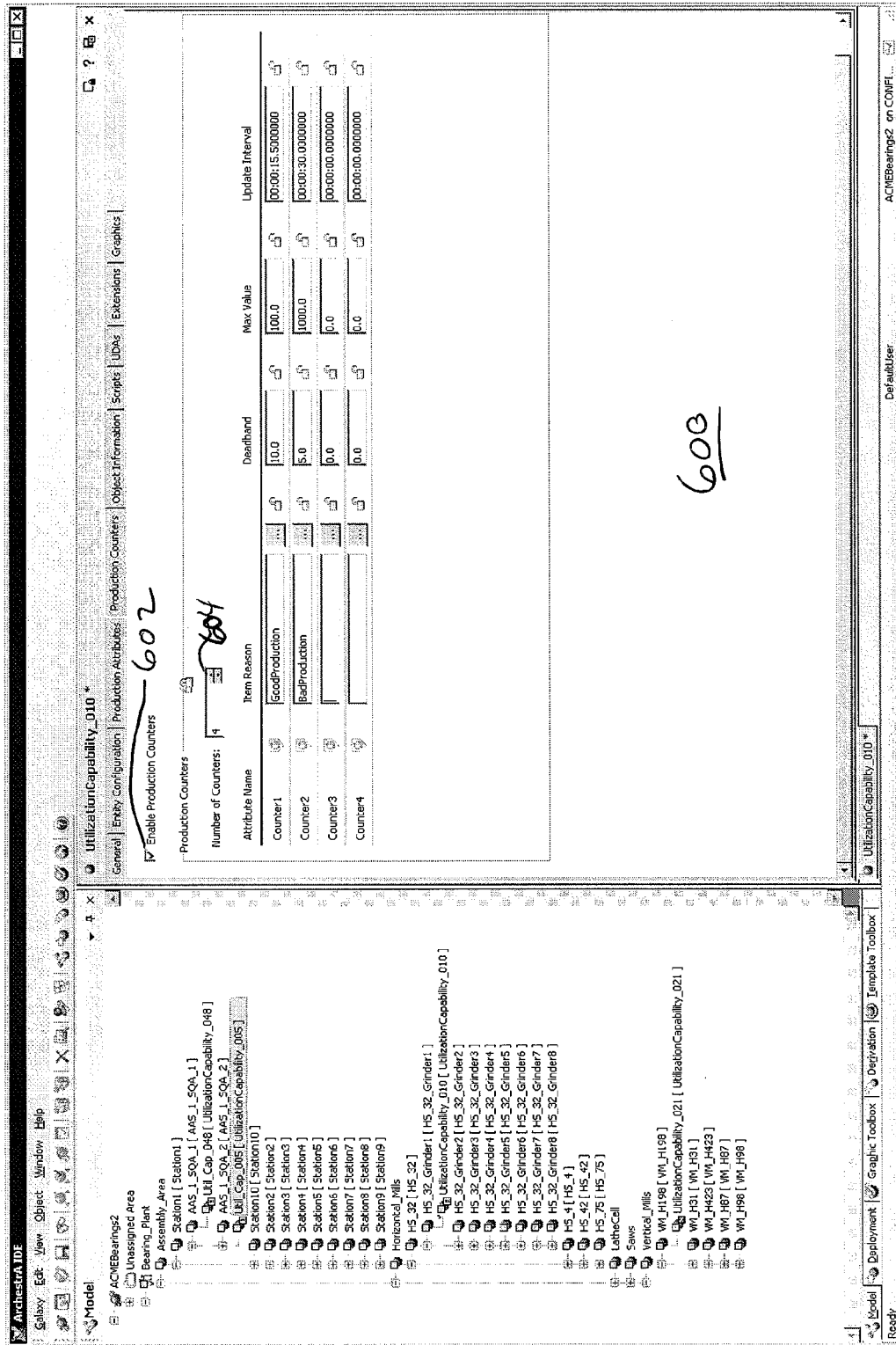
FIG. 6 is an exemplary graphical user interface for a UCO configuration utility executing on a computer that facilitates configuration of production counters for a UCO.

Turning to FIGS. 2D and 6, a user configures up to 10 production counters on a UCO through a production counters configuration user interface. The production counters are thereafter used at runtime to add production (i.e., a recording in the MES system that production has occurred with respect to an identified item) against a job that is running on an MES entity represented by the UCO. The production counters configuration user interface 600 depicted in FIG. 6 supports configuration of the following counter options maintained within the UCO and identified in FIG. 2D. An enable production counter select box 602 determines whether a production counter primitive will be created when the UCO is deployed. A number of counters box 604 enables a user to designate how many production counters will be configured and subsequently included in the production counter primitive of a deployed UCO.

With reference to FIGS. 2D and 6, the following configurable information pieces are included for each designated production counter contained in the production counters primitive 240. An item reason 241 contains a text string used to describe the counter (e.g., good production, bad production, etc.). An update interval 242 contains a time period between previous and next logging of a production counter value. A deadband 243 specifies an amount that the production counter must change before a new value for the production counter is logged. A maximum value 244 specifies a highest value for the production counter before the counter rolls over.

Defining/Building an Entity (Database Element) in the MES

Having described the configurable contents of the UCO and an exemplary set of user interfaces for carrying out such configuration, attention is directed to an exemplary process carried out through the entity model builder 120 (within the IDE) for transforming a UCO configuration into a corresponding MES entity (an MES database element corresponding to, for example, a piece of equipment represented by the configured UCO). The entity model builder 120 utilizes configured UCOs to automatically render corresponding MES entities and avoids manually defining MES entities corresponding to plant equipment that is already represented by an object (e.g., Archestra application object) in the SCADA configuration of a plant/process. Once created, the MES entities are used to execute jobs, capture utilization, and track overall equipment efficiency (OEE) according to configured production attributes specified in the production attributes primitive 220 of the UCO. The entity model builder during configuration time keeps the equipment model synchronized between the SCADA system and MES system (database). The entity model builder thus, maintains a record of the corresponding entities created in the MES system database and modifies the contents accordingly as the SCADA objects are added, modified and deleted.

Figure 7:
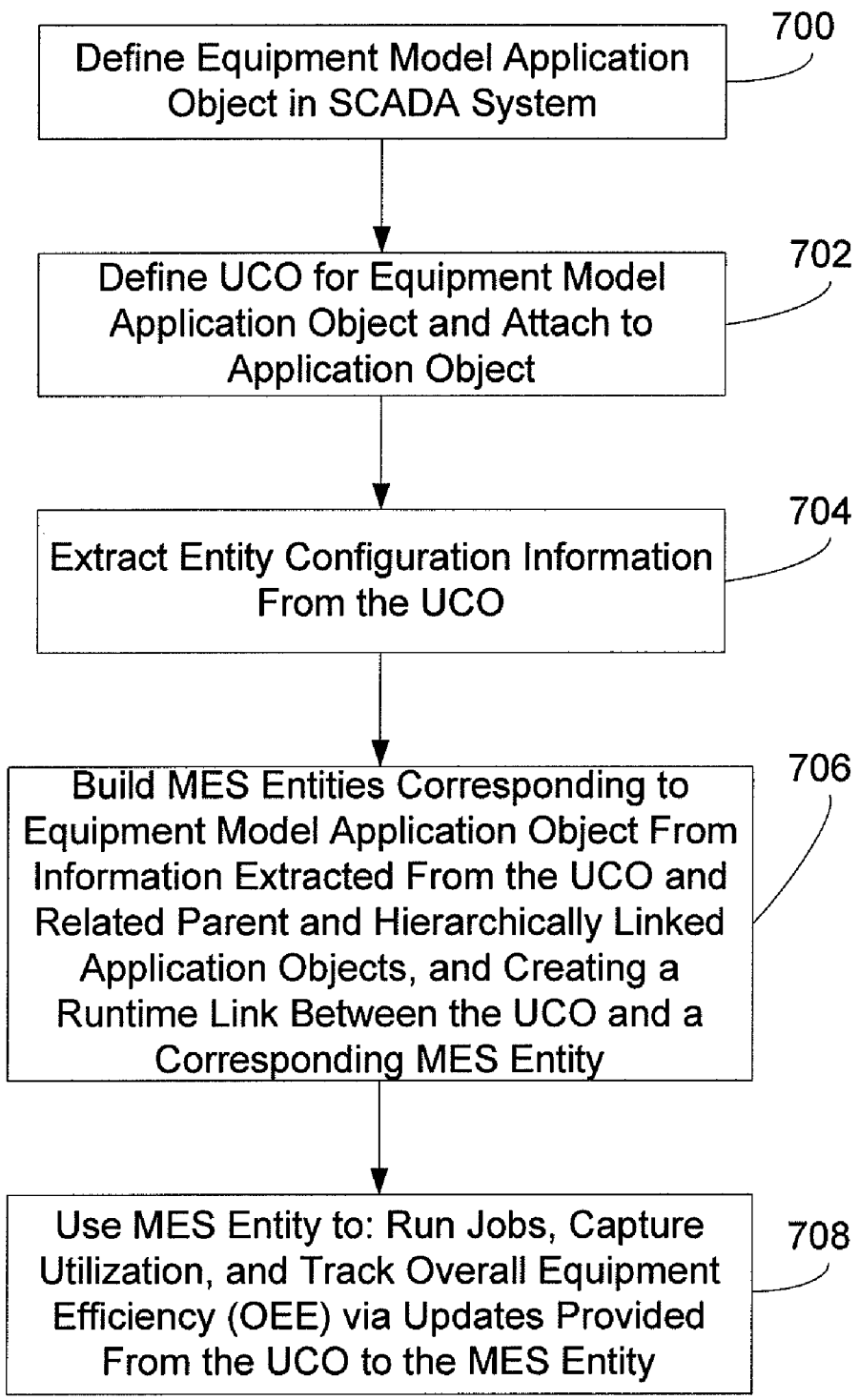
FIG. 7 is a flowchart including an exemplary set of steps for creating and utilizing an MES entity linked to a corresponding SCADA system's UCO.

Turning to FIG. 7, an exemplary set of steps summarize the creation and subsequent operation of an MES entity using a previously configured UCO corresponding to plant equipment. At step 700 an application object corresponding to plant equipment of interest is provided in the SCADA system. In many instances such application object already exists in a SCADA configuration database.

Thereafter, at step 702 a UCO is configured and attached as a child object to the application object provided during step 700. Configuration of the UCO primitives is carried out, by way of example, through the UCO configuration interfaces described herein above with reference to FIGS. 3-6. The UCO, is thus attached to an existing SCADA object as a facet that enables the following further functionality: exporting the configured UCO information into the MES database 130 as a new entity, and providing a channel whereby information utilized by the MES entity is passed at runtime from the SCADA system to the MES entity via the UCO and its configured primitives.

Figure 8:
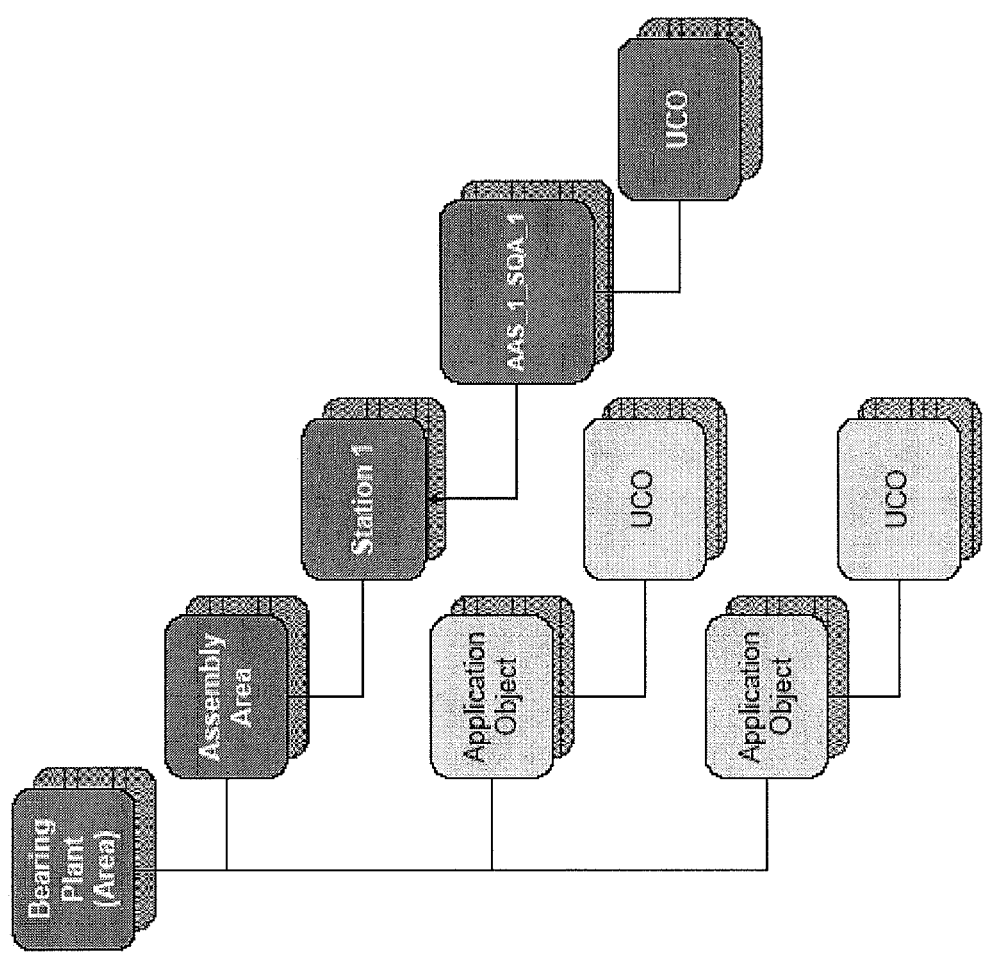
FIG. 8 is a schematic drawing showing an exemplary hierarchical tree structure representing relationships between a set of UCO's and their corresponding parent application objects (and higher level ancestor objects)

A schematic view of an exemplary set of application objects and their child UCOs is provided, by way of example, in FIG. 8. In the illustrative example, UCOs have been attached as children to three different application objects. The entity model builder 120, when invoked on the UCOs, comprises computer executable instructions (stored on computer-readable media) for using configuration information from the relevant UCO and equipment model relationships defined in the SCADA configuration environment (i.e., parent application objects of the application object to which the UCO is attached) to create corresponding MES entities for the parent of the UCO as well as any parent application objects up through, and including the area containing the application object to which the UCO is attached. In the exemplary embodiment, invoking the entity model builder 120 on the UCO attached to an AAS_1_SQA_1 application object results in the creation of MES entities in the MES database 130 for the AAS_1_SQA_1, Station 1, Assembly Area and Bearing Plant (Area) application objects, and the hierarchical relationships between each of these objects is maintained in the MES environment. The objects labeled "Application Object" are recreated as entities in the MES database based on their own, separately configured UCOs.

After invoking the entity model builder 120 on a selected UCO, during step 704 the entity model builder extracts the MES entity configuration data (see, FIGS. 2B and 4) from the UCO. The extracted information comprises, by way of example, the configured performance target and utilization information discussed herein above with reference to FIGS. 2B and 4. More specifically, the entity model builder extracts the following from the UCO.

target utilization percent
    target OEE percent
    target performance percent
    target quality percent
    default production rate
    default production unit
    raw reason codes For each raw reason code in the UCO, the following information is extracted.

Raw reason code
    Default reason code

Prompt flag
Set of allowable reasons codes

At step 706 the entity model builder 120 builds MES entities (via calls to known MES database interface functionality) in the MES database 130 corresponding to: (1) the equipment application object to which the UCO, and (2) any parent application objects of the parent object of the UCO (up to the parent "area" application object). The hierarchical relationships of the SCADA application objects are retained in the MES database 130 entities. When the entity model builder creates entities in the MES database 130, the entity names are based on the TagName attribute in the corresponding source application object. From the example in FIG. 8, the entity model builder 120 produces four entities in the MES database 130 using the TagNames set forth in the illustrative example. The final entity (AAS_1_SQA_1) child has utilization/OEE tracking capabilities set in the MES database 130.

+Bearing_Plant (Area)
 +Assembly_Area
  +Station1
   +AAS_1_SQA_1.

During step 706, the entity model builder 120 writes the information extracted from the UCO during step 704 to the corresponding entity (e.g., and entity corresponding to AAS_1_SQA_1) in the MES database 130 via a known MES interface method.

An important consequence of the creation of the UCO and subsequent creation of a corresponding MES entity is the creation of a runtime link between the UCO and the MES entity that facilitates updating the MES entity via equipment utilization and reason codes (equipment status changes) generated by the UCO in response to process data received by the SCADA system object with which the UCO is associated.

The runtime data is used by the MES entity during step 708 for carry out a variety of functions supported by the MES entity through the MES application 140 including, as those skilled in the art will readily appreciate: running jobs, capturing utilization, and tracking OEE.

UCO Runtime Requirements/Behaviors

Turning to FIG. 9, a set of fields/attributes associated with the runtime of a UCO are identified. It is noted that the runtime UCO includes the configuration information discussed herein above with reference to FIGS. 2B, 2C, 2D and 3-6. An equipment status attributes 900 comprises a set of configured equipment status and entity configuration parameter values for the MES entity corresponding to the UCO. The equipment status attributes 900 are configured via the general and entity configuration user interfaces in FIGS. 3 and 4 described with reference to FIG. 2B.

A production attributes 901 comprises a set of configured production attribute parameter values for the MES entity corresponding to the UCO. The production attribute parameters are configured via the entity configuration user interface in FIG. 5 and described with reference to FIG. 2C. An Add Production Quantity 902 contains a quantity of additional production that has been requested by a user. In an exemplary embodiment, the value is an absolute quantity of production to be added to a current production request value already stored in the corresponding MES Entity. Alternatively, a final quantity value could be specified. An Add Production Quantity Counter 904 maintains a value of production quantity to be added to the current production quantity value maintained by the corresponding MES entity. The Add Production Quantity Counter 904 value is passed to the MES entity in response to one or a combination of the following potentially triggering conditions: (1) the add production quantity value has changed, (2) the new quantity value exceeds a configured dead band (for updating the production quantity in the MES database), (3) the update interval has been exceeded since the last data upload. When the data value upload is triggered, the difference between the current and new set production values is cached and uploaded to the MES database 130. The new value must be greater than the existing value. Otherwise, the update mechanism assumes the counter rolled over and calculates an amount to be added based on a rollover algorithm. The UCO runtime also includes a set of counter attributes 906 corresponding to the configurable counter information discussed herein above with reference to the exemplary counter configuration user interface in FIG. 6 and described with reference to FIG. 2D.

With continued reference to FIG. 9, the UCO includes a set of current runtime performance/production values 908 for production performance/quality/utilization/OEE for logging and comparison to a set of configured target performance/production values described herein above with reference to the performance targets and production rates part 216 described herein above.

The next set of fields within the exemplary runtime UCO relate to the currently active reason code. In an exemplary embodiment, the currently active reason code is the highest priority reason code having an expression that evaluates to TRUE, or if none evaluate to TRUE, then the default reason code. A raw reason code 910 contains a currently active reason code. A reason code default reason 912 contains the default reason specified for the currently active raw reason code. A raw reason code delay 914 specifies a minimum time period that the currently active reason code must evaluate to TRUE before it is recorded as being active (with an activation time corresponding to when the currently active reason code evaluated to TRUE. A raw reason code time entered 916 stores the time that the currently active raw reason code changed (from a previously active raw reason code value). A time in raw reason code 918 contains the time duration the currently active raw reason code has continuously evaluated to TRUE. A raw reason code description 920 contains a description of the currently active raw reason code. A set of spare attributes 922 contain previously configured context information (see, "spare comments 334") for a currently active raw reason code.

A Previous raw reason code 923 contains the raw reason code that was active prior to the currently active raw reason code (specified in the raw reason code 910).

A status field 924 contains the current status of the UCO. If the status is in an "error" state, a user addresses the identified error and then uses a reset command attribute 926 to trigger computer executable instructions that clear any raw reason code evaluation errors so that operation of the UCO scripts can resume.

UCO Runtime Operation

Having described the general structure and functionality of the UCO and its corresponding MES entity, attention is directed to exemplary runtime behavior of the UCO.

1. UCO Startup

At startup, all raw reason code expression codes are compiled in preparation for their evaluation in view of a set of status parameters associated with the parent SCADA equipment object. Furthermore, if the start job on deploy attribute 232 is set to true, then the values of all production attributes are used and a method is invoked on the UCO to start a new production data entry job using configured production attribute values for the UCO described herein above with reference to FIG. 2C.

2. UCO OnScan

When the UCO object goes on-scan, the Equipment Status primitive enters a previously checkpointed raw reason code (if available) and otherwise enters a configured default reason code (state). The default raw reason code is stored in the exposed current raw reason code 910 attribute of the UCO. All attribute references contained in the default raw reason code's expressions are resolved and set on "Advise." The quality of the current state attribute is set to "Initializing."

3. UCO Execute

Figure 10:
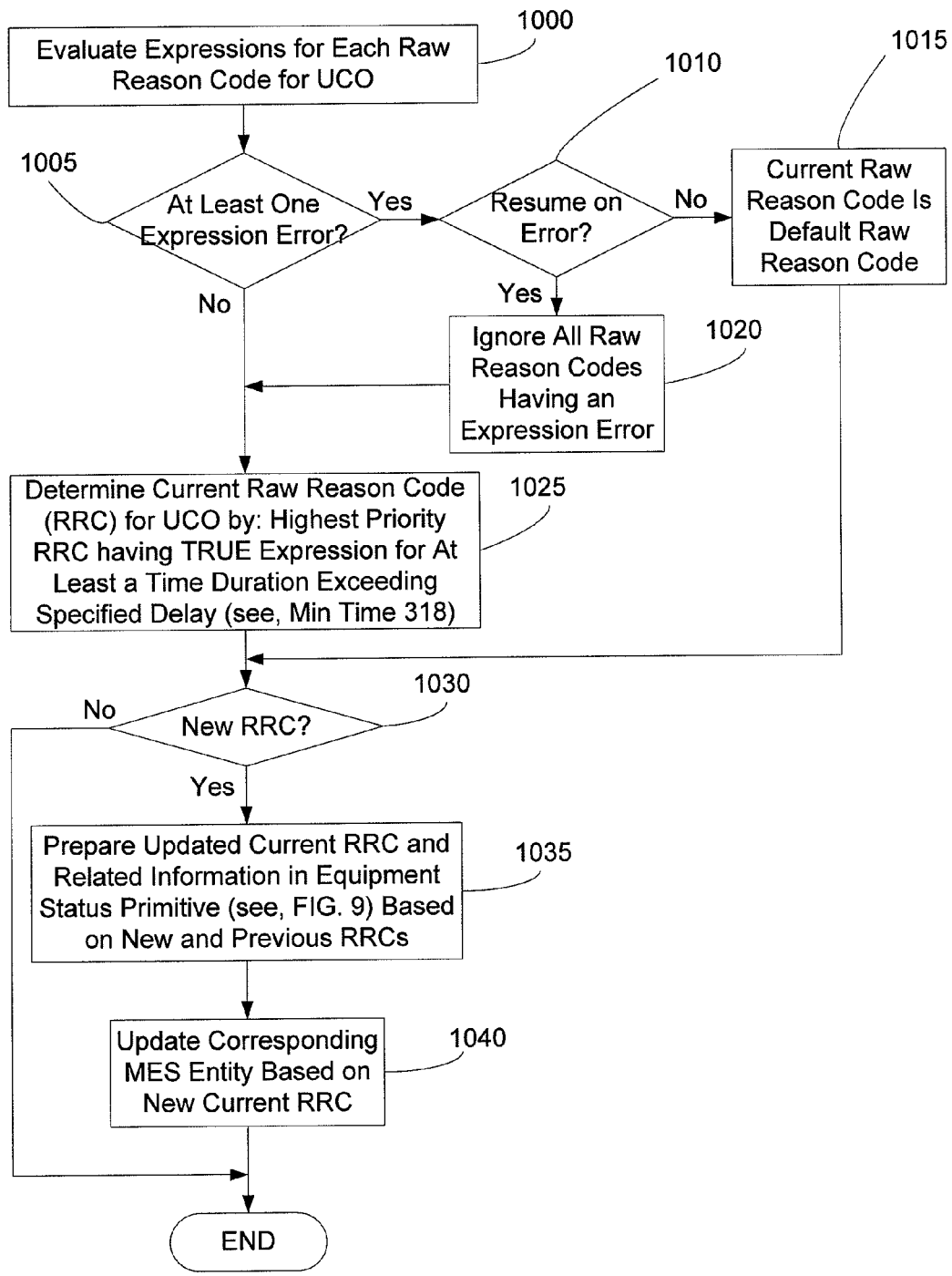
FIG. 10 is a flowchart including an exemplary set of steps for updating the current raw reason code (status) for a UCO and communicating updated equipment information to a corresponding MES entity.

The Execute operational state of the UCO is described herein below with reference to the steps summarized in FIG. 10. During each execution cycle, the Equipment Status primitive evaluates each expression associated with a raw reason code configured on the UCO (step 1000) to determine if a raw reason code transition has occurred. Details on how a raw reason code transition is determined are provided below. Whenever a raw reason code transition occurs (step 1030), the Equipment status primitive prepares (step 1035) and publishes (step 1040) to the MES entity via a known interface, through attributes, the information discussed previously herein above with reference to FIG. 9, the new raw reason code, the time that the raw reason code was entered, the configured minimum activation time, the class, the color, and the name of the previously active raw reason code. Time entered will be exposed in local engine time and in UTC. If, at step 1030, the current raw reason code is unchanged from the previous cycle, then control passes to the End.

Informational logging (traces) is sent to an equipment status (raw reason codes) logger in order to facilitate debugging of raw reason code transitions. A custom log flag is provided to allow users to toggle display of Equipment Status primitive informational messages. Information logged includes the raw reason code and the time the raw reason code was entered.

4. UCO Offscan

When the UCO goes Offscan, all attribute references put on "Advise" during OnScan will be taken off of "Advise." The quality of the raw reason code attribute is set to "Bad."

5. Failover Behavior

The exposed raw reason code attributes (as listed in the attribute DFS) are checkpointed during object execution. On failover to the redundant object, these attributes will have the most recent checkpoint values. The quality of the attributes becomes "uncertain." Execution continues as if the checkpoint raw reason code was a pre-existing current raw reason code and no new raw reason code is reported until a new raw reason code transition occurs. All internal information (such as the minimum activation time timers) is reset, as if the object had just started to evaluate raw reason code transitions after coming on-scan.

6. Event Message Delivery

Event messages are delivered using only the without-response approach applied for production event messaging using MICROSOFT MESSAGE QUEUE (MSMQ). On failover, messages already on the local queue of the primary machine will remain on the queue until the machine resumes execution. Event messages that are queued for delivery to the Production Database (or that are in the process of being delivered) may be lost without user notification when the failover to the redundant engine (or the failover back to the original engine) occurs. For example, if the engine hosting the queue prior to the failover shuts down after failing over, messages still waiting in the queue for delivery are lost.

7. Raw Reason Code Transitions

Each raw reason code in the Equipment Status primitive of a UCO is configured with an expression. Regarding raw reason code transitions, the default behavior during execution is to trigger an event representing entry into a new raw reason code (state) if: (1) the raw reason code's expression evaluates to true, (2) it is the highest priority raw reason code (as configured) whose minimum activation time has elapsed, and (3) it is different from the previous raw reason code entered. When a new raw reason code is entered, the new raw reason code is exposed through an attribute on the UCO.

Expression errors are handled in one of two ways depending upon the configuration setting (see step 1010). If the object is configured to stop on error, then if any of the expressions result in an error during evaluation during step 1005 (for instance, an attribute reference cannot be resolved), the default raw reason code is assigned to the current raw reason code (step 1015). Alternatively, the raw reason code does not change and instead the error is registered via a message sent to a logger indicating the raw reason code and expression that caused the error. In the alternative embodiment, no raw reason code transitions occur as long as expression evaluation errors occur. However, the UCO attempts to evaluate all expressions once again on the next scan. If the object is not configured to stop (Resume on Error is "Yes" at step 1010), then any invalid expression is skipped (step 1020) and the raw reason code determination proceeds as usual (at step 1025) with the remaining raw reason code expressions that did not have expression errors. The offending raw reason code expression is re-evaluated during the next scan cycle. Of course if no expression errors are encountered, then control passes from step 1005 to step 1025.

8. Raw Reason Code Determination Procedure (Step 10250)

The procedure for determining the current raw reason code of the equipment is, for example, as follows:

1. Find each raw reason code whose expression currently evaluates to "true"
2. For each raw reason code from 1, start its delay timer if its expression evaluated to "false" during the last cycle and record the current time as that raw reason code's start time
3. Select all raw reason codes from 2 that have a delay timer that exceeds the respective minimum activation time
4. From the set of raw reason codes in 3, select the highest priority raw reason code and report it as the current active raw reason code. If no raw reason code meets the criteria, report the Default Raw reason code as the active raw reason code.

This sequence of steps considers minimum activation time first and subsequently applies the configured prioritization of raw reason codes. Proper use of minimum activation times may reduce "noise" in the reported raw reason codes by preventing small, unimportant raw reason code transitions from being reported.

9. UCO Micro States

In a particular embodiment, the Equipment Status primitive of each UCO has the capability to mark current raw reason codes (states) (with small duration as micro-states, so that they can be rolled-up at reporting time. If micro-states are configured for a state, then at runtime there will be a minimum time period to be in a state before the state is logged as a raw reason code. If the transition to a new state occurs before this time period elapses, the state is marked as a micro-state. The minimum event time is different from the state transition delay described above. Typically, the minimum event time should be configured greater than the state transition delay. In this case, no state transition will be reported unless the state transition delay has elapsed. If the elapsed time in the state meets or exceeds the state transition delay but is less than the minimum event time, then the state will be reported as a micro-state. Once the time in the state meets or exceeds the minimum event time, the state will be logged as a normal state.

Minimum event time affects logging but does NOT impact reporting of a current reason code through the exposed attributes. In other words, once a current raw reason code transition delay is exceeded, the raw reason code information is immediately exposed through attributes regardless of whether a minimum event time is configured. Thus, a micro-state will not be logged if the minimum event time has not been exceeded, but the UCO will update the exposed attributes to accurately reflect the current state. For example, if a machine has a mechanical problem and tends to slip into 'slow speed' a couple times an hour, but only for 30 seconds at a time, you would want to know, at the operator station, what state it was in (normal or slow speed), but unless it lasted more than 2 minutes (Minimum Event Time=2 minutes), you don't want to log it as a change in state (current raw reason code). Instead, you just want to count how many times it happened over the course of an hour, or shift, or day.

10. Default Reason Code

The Default Raw reason code is a special raw reason code that indicates when the status of the equipment is indeterminate. Specifically, the Default raw reason code is used to indicate that no other raw reason code's expression evaluates to true or that no raw reason code's minimum activation time has elapsed.

If the configured Default Raw reason code has a minimum activation time, it is not used when determining the default case just described.

11. Reason Code Acknowledgements

Each raw reason code is configurable to Prompt (see, Prompt 320) when the raw reason code becomes active. The prompt feature of the UCO Equipment Status Primitive is used to notify operators when equipment has entered a raw reason code requiring their immediate attention.

12. Logging Behavior

Raw reason code transitions are logged to a Production Database. Named Events are logged to the production database. When triggered to log an event, and before actually sending the event data to the Production Database, the Equipment Status primitive resolves references to external attributes to their absolute, unique InSQL tagnames. For example, a reference to "MyContainer.Level" is resolved to "Tank1.Level" before logging the attribute name with the rest of the event data. The following data is logged for all equipment status events and Named Events. The term "logged" does not necessarily imply that the data is stored in the MES database 130 in any particular format, but it does imply that the value can be retrieved from the event record in the database afterwards.

| Data Logged | Description | Revision Notes |
| --- | --- | --- |
| FileTimeUtc | The date and time that the event occurred | Same as PEM 2.0 |
| LoggingObjectTagName | TagName of the object that is logging the event | Same as PEM 2.0 |
| LoggingObjectHierarchicalName | Hierarchical name of the object that is logging the event. | Same as PEM 2.0 |
| LoggingObjectAreaTagName | TagName of the Area that the logging GObject belongs to. | Same as PEM 2.0 |
| LoggingObjectAreaHierarchalName | HierarchicalName of the Area that the logging GObject belongs to. | Same as PEM 2.0 |
| ReceivedFileTimeUtc | The date and time that the event was written to the database. This is unique across all messages to allow for message ordering. | Same as PEM 2.0 |
| ProductionPeriod | | New to Equipment Status |
| Shift | Time period of work during the day when this event was logged. | New to Equipment Status |
| Team | Group of people that work together on the equipment when this event was logged. | New to Equipment Status |
| EquipmentType | Group of equipment that logged the event. | New to Equipment Status |

The value of every expression, calendar attribute, production attribute and extended production attribute can optionally be tied to an external attribute. Logged values that are configured this way will have the following additional information logged.

| Data Logged | Description | Revision Notes |
| --- | --- | --- |
| Source Reference String | If the EPA is bound to an input source, this will contain the user supplied attribute reference string. | Same as PEM 2.0 |
| Source Tag Name | If the EPA value is bound to an input source, this will contain the tag name of the bound reference. This will be empty if the reference could not be bound. | Same as PEM 2.0 |
| Source Attribute Name | If the EPA value is bound to an input source, this will contain the attribute of the bound reference. This will be empty if the reference could not be bound. | Same as PEM 2.0 |

The following data is logged for every raw reason code transition event:

| Data Logged | Description | Revision Notes |
|---|---|---|
| Raw reason code | Raw reason code of the event. | New to Equipment Status |
| IsMicroState | Whether or not the state is a micro-state. | New to Equipment Status |
| AvailabilityCategory | Configured availability category for the event. | New to Equipment Status |
| PerformanceCategory | Configured performance category for the event. | New to Equipment Status |
| QualityCategory | Configured quality category for the event. | New to Equipment Status |
| OtherCategory | Configured other category for the event. | New to Equipment Status |

13. Alarms

Two types of alarm conditions are made available for equipment monitoring:

1. An alarm indicating that an error occurred while attempting to determine the current raw reason code. For instance, an attribute reference contained in an expression for a raw reason code goes to bad quality. This alarm will be provided using an alarm primitive within the object.

2. The user will be able to monitor the current raw reason code and use scripting in conjunction with alarm extensions to trigger an alarm. For instance, a field attribute of type Boolean can be added to the Utilization Capability Object and an alarm extension set on it. Then, a script can be written to set this attribute if a specific raw reason code or set of raw reason codes is detected on the object.

Use Cases

Having described an exemplary system and a UCO that is utilized therein to streamline configuration of data links between a SCADA system and an MES, attention is directed to a set of exemplary "use cases" describing the configuration and use of the UCOs in an exemplary integrated SCADA and MES environment. "Use cases" described herein below address: (1) Creating An MES Entity Model from a UCO; (2) Configuring Raw reason code Monitoring and Event Logging in a UCO; and (3) Executing Raw reason code Monitoring and Event Logging in a UCO.

1. Creating an MES Entity Model from a UCO Using the Model Builder Program

Description:

This use case describes how an MES Entity Model is created and maintained from a utilization capability object (SCADA model) stored in a SCADA configuration database.

Actor: Lenka, Senior Engineer

General Preconditions:

1) Lenka has started the ArchestrA IDE and has imported the Utilization Capability Application Object.

2) An MES system (e.g., Factelligence Server database and middleware) has been installed.

3) Lenka's system has been properly setup to talk to Factelligence Middleware (via COM+ Proxy or other middleware transport).

4) Lenka's system has had the Entity Model Builder feature installed. See UC 1266

Scenario 1: Create New Factelligence (MES) Entities

Specific Preconditions:

1) Lenka builds a Model View by adding UCO instances beneath any Application Object that she wants to become a Factelligence MES Entity. All the parent application objects, up to and including the Area, will become Factelligence MES Entities as well.

2) Lenka configures the UCO instances with the various Utilization properties.

Basic Course:

1) Lenka right-clicks the parent Application Object (or any parent up the tree) and chooses the "Build Entity Model . . ." menu item. Alternatively, Lenka can choose the same menu item from the IDE's "Object" menu. This action functions similar to the "Deploy" action. All Entity definitions below the selected object will be created by an MES Entity Model Builder software utility executing on the system.

2) The system's automated MES Entity Model Builder will build the Factelligence MES Entity model while presenting Lenka with a progress dialog. When it is done, Lenka can review the results and dismiss the progress dialog. The results will also be logged to the WWLogger.

a. A warning will be reported if two or more Utilization Capability Objects exist under a single parent Application Object. The first one detected will be the one to provide the Utilization/OEE configuration data.

Specific Post Conditions:

1) The new MES entity model has been defined in the Factelligence MES database. It has the same structure that it had in the IDE Model View, as defined by the presence of UCOs.

2) Utilization/OEE Configuration Information is pulled from the UCOs and stored on their corresponding Factelligence MES Entities.

3) The unified (via the MES entity Model Builder) UCOs are marked indicating that corresponding MES entity models were successfully configured in Factelligence.

Scenario 2: Modify Existing Factelligence Entities

Specific Preconditions:

1) Scenario 1 has been executed OR in some cases an Entity Model has been manually edited/created using the Factelligence Configurator application 2) Lenka edits her SCADA Model View by doing any of the following. These will cause a modification of existing Entities a. Changes the configuration of any of her Utilization Capability Application Objects.

b. Adds a Utilization Capability Application Object at higher levels in the Utilization Capability tree c. Moves an Application Object at a higher level in a Utilization Capability tree (re-parent)

d. Renames an Application Object at a higher level in the Utilization Capability tree.

e. Adds an Application Object as part of a Utilization Capability tree, that has the same name as an Entity manually configured by Configurator (possible re-parent)

3) Lenka edits the SCADA Model View by doing any of the following. These actions will cause Utilization/OEE capabilities to be disabled in Factelligence for the Entity involved.

a. Moves any of her Utilization Capability Application Objects to sit under another parent Application Object. So the old parent is no longer considered an Entity.

b. Deletes a Utilization Capability Application Object or one of its parents

Basic Course:
1) Lenka right-clicks the parent Application Object (or any parent up the tree) and chooses the "Build Entity Model . . . " menu item. Alternatively, Lenka can choose the same menu item from the IDE's "Object" menu.
2) The system will build and/or update the Factelligence MES Entity model while presenting Lenka with a progress dialog. When it is done, Lenka can review the results and dismiss the progress dialog. The results will also be logged to the WWLogger.
   a. A warning will be reported if two or more Utilization Capability Objects exist under a single parent Application Object. The first one detected will be the one to provide the Utilization/OEE configuration data.
Specific Post Conditions:
1) The entity model has been updated in the Factelligence database. It has the same structure that it had in the IDE Model View, as defined by the presence of UCOs.
2) Utilization/OEE Configuration Information is pulled from the UCOs and stored on their corresponding Factelligence Entities.
3) Non-Util/OEE related configuration on existing Entities will not be changed (i.e. shifts, etc). Only Util/OEE information will be updated.
4) If the update would have resulted in the removal of a Factelligence Entity (see #3 pre-condition), then the Util/OEE Capabilities for the Entity will be removed, but the Entity will not be deleted.
5) The exported Utilization Capability objects are marked indicating if they were successfully configured in Factelligence.
2. Configuring Raw Reason Code Monitoring and Event Logging (See FIG. 2)
Actors: Lenka, Senior Engineer
Description: This Use Case defines the configuration of Machine Raw reason code Monitoring for the Utilization Capability Application Object.
General Preconditions:
1) A galaxy (SCADA system configuration database) exists
2) The IDE is open
3) The UCO was imported into ArchestrA.
Scenario 1: Configure a Machine Raw Reason Code Monitor
Specific Preconditions
1) None
Basic Course
1) Lenka opens a Utilization Capability Application Object template or instance and selects the Machine Raw reason code Monitoring user interface.
2) Lenka then adds new Machine Raw reason codes. She configures:
   a. Name
   b. Description
   c. Expression
   d. Minimum time before activation (no transition will occur if less than this time, "Deadband")
   e. Default Reason (Lenka browses for a reason in Factelligence.)
   f. Prompt
3) Lenka then configures a Default Machine Raw reason code by selecting an existing Machine Raw reason code or by configuring the following.
   a. Name
   b. Description
   c. Default Reason (Lenka browses for a reason in Factelligence.)
   d. Prompt 4) The evaluation order of machine raw reason codes will be apparent to Lenka.
5) Lenka may modify the evaluation order of machine raw reason code.
6) Lenka then configures how machine raw reason code evaluation errors will be handled.
   a. Resume on Error
   b. Alarm on Error (Configuring to Resume on Error will not prevent an Alarm to be raised.)
      i. Priority
      ii. Alarm Message
7) Lenka saves the changes.
Specific Post Conditions:
1) Machine raw reason codes are configured and the object is ready to be deployed.
Scenario 2: Configure Allowable Reasons
Specific Preconditions:
1) None
Basic Course:
1) Lenka opens a Utilization Capability ApplicationObject template or instance and selects the Entity Configuration tab.
2) Lenka will be able to view all the Reason Groups and Reasons defined in Factelligence.
3) Lenka configures the allowable reasons by selecting the Reason Groups or Reasons. (Note: If no Reason Group or Reason is selected all reasons will be allowable.)
4) Lenka saves the changes.
Specific Post Conditions:
1) The allowable reasons are now defined for this object.
2) When an Instance of this object is contained by an Object in the IDE the Entity Model Builder can then define an Entity with the allowable reasons in Factelligence.
   a. Instances of this object will have validation errors until the Entity Model Builder runs against this object.
Scenario 3: Configure Production Attributes
Specific Preconditions:
1) None
Basic Course:
1) Lenka opens a Utilization Capability ApplicationObject template or instance and selects the Production Attribute tab.
2) Lenka can choose to create if doesn't exist. (For example if the Item Production Attribute was logged with the value of "Item123" and that item doesn't exists in Factelligence should it be created.)
3) Lenka is able to configure all the Production Attributes specified in Equipment Raw reason code Monitoring and Event Logging DFS. Lenka can configure each Production Attribute the following way.
   a. Use Input Source
   b. Input Source or Default Value
4) Lenka saves the changes
Specific Post Conditions:
1) Production Attributes are now configured to be logged with Machine Raw reason code changes.
Scenario 4: Configure Performance Parameters
Specific Preconditions:
1) None
Basic Course:
1) Lenka opens a Utilization Capability ApplicationObject template or instance and selects the Entity Configuration tab.
2) Lenka configures the following Performance Parameters
   a. Target Utilization Percent
   b. Target OEE Percent c. Target Performance Percent
d. Target Quality Percent
e. Default Production Rate
f. Default Production Unit
3) Lenka saves the changes
Specific Post Conditions:
1) The Performance Parameters are now defined for this object.
2) When an Instance of this object is contained by an Object in the IDE the Entity Model Builder can then define an Entity with the Performance Parameters in Factelligence.
 a. Instances of this object will have validation errors until the Entity Model Builder runs against this object.
Scenario 5 Configure Raw Reason Code and Event Capability
Specific Preconditions:
1) A Calendar ApplicationObject has been configured.
Basic Course:
1) Lenka opens the UserDefined instance or template.
2) Lenka can configure the following properties:
 a. Location as a Value or Attribute Reference
 b. Equipment Type as Value or Attribute Reference
 c. Enable Logging of events
3) Lenka can configure the following as Values, Attribute References, or by selecting a Calendar ApplicationObject. Lenka browses to and selects a Calendar ApplicationObject to reference when logging events. The object reference will be used to configure:
 a. Production Period
 b. Shift
 c. Teams
4) Lenka can configure options to trigger a raw reason code event based on changes to selected Calendar Attributes.
5) Lenka can select Production Attributes to log.
6) Lenka configures the Extended Production Attributes she wants to log.
7) Lenka configures validation for the Production Attributes and Extended Production Attribute she wants to log.
Specific Post Conditions:
1) The UserDefined ApplicationObject is prepared to configure Raw reason codes and Events. The UserDefined ApplicationObject is configured with the information to be logged when events are logged.
2) Attributes configured for this scenario will be global for all Raw reason codes and Events of this ApplicationObject.
Scenario 6 Configure Named Event Triggers
Specific Preconditions:
1) Scenario 1 has been executed.
Basic Course:
1) Lenka selects the Named Event Trigger user interface.
2) Lenka has the option to Add, Modify, or delete a Named event trigger.
3) Lenka adds new Named Event Triggers. She configures:
 a. Name
 b. Description
 c. Trigger Attribute or Expression
 d. Raw Reason Code
Specific Post Conditions:
1) Lenka has configured Named Events Triggers.
3. Executing Raw Reason Code Monitoring and Event Logging (on UCOs)
Actors: Lenka, Senior Engineer
Description: This use case describes the runtime behavior of the UCO's raw reason code monitoring and event logging functionality. Raw reason codes will be logged as events to the database when the following occurs.

1. The object evaluates a change in raw reason code.
2. The calendar values configured change.
3. A named event trigger is evaluated to true.
4. The object goes off scan.
General Preconditions:
1) Configuration of Raw reason code Monitoring and Event Logging has been successfully executed. (See above)
2) Lenka has deployed the configured Utilization Capability Object Instance.
Scenario 1: UCO Goes OnScan
Specific Preconditions:
1) An instance of the Utilization Capability Object is deployed and OffScan.
2) Lenka has the Object Viewer open and the Utilization Capability Object instance selected.
Basic Course:
1) Lenka sets the Utilization Capability Object OnScan.
2) The ApplicationObject goes OnScan.
 a. If all Triggers (expressions) for raw reason codes have a quality of initializing and the ApplicationObject Instance is starting from checkpoint or failover then the Current Raw reason code will be the same as the Raw reason code from the check point. If the ApplicationObject is not starting from checkpoint (or failover) then the Default Raw reason code will be activated as Current Raw reason code with a quality of Initializing.
 b. When one or more of the Triggers (expressions) leaves initializing then scenario 3 is in effect.
Specific Post Conditions:
1) The ApplicationObject's Raw reason code attribute contains the current Raw reason code Name.
2) If Lenka has configured the logger to view messages for the Raw reason code Monitoring and Event Logging custom log flags for the Utilization Capability Object, she sees the detailed raw reason code change message in the SMC (including the information logged to the Production Database).
3) Onscan is stored with the event as context.
Scenario 2: Utilization Capability Object Evaluates Raw Reason Code
Specific Preconditions:
1) An instance of the Utilization Capability Object OnScan.
Basic Course:
1) During a scan, the object checks the value of each Raw reason code Trigger (expression), in the configured evaluation order and determines if a Raw reason code activation occurred, and if microstate statistics need to be recorded.
Specific Post Conditions:
1) If a Raw reason code activation occurred and Event logging is enabled then the Raw reason code Event is logged with the scan time of the ApplicationObject. Microstate statistics are logged at the same time.
2) A raw reason code change is recorded in the event as context.
3) The ApplicationObject's Raw reason code attribute contains the current Raw reason code Name.
4) If Lenka has configured the logger to view messages for the Raw reason code Monitoring and Event Logging custom log flags for the Utilization Capability Object, she sees the detailed raw reason code change message in the SMC (including the information logged to the Production Database).
 The default raw reason code is treated as other raw reason codes but it will always evaluate to true and will be the last raw reason code evaluated.

Scenario 3: Utilization Capability Object Goes OffScan
   Specific Preconditions:
      1) An instance of the Utilization Capability Object is OnScan.
      2) Lenka has the Object Viewer open and the Utilization Capability Object instance selected.
   Basic Course:
      1) Lenka sets the Utilization Capability Object instance to OffScan.
      2) The object goes OffScan.
   Specific Post Conditions:
      1) The Current Raw reason code is logged and microstate statistics are recorded.
      2) Offscan is stored with the event as context.
      3) The ApplicationObjects Raw reason code attribute contains the current Raw reason code Name. The Raw reason code Attributes quality becomes Uncertain.
      4) If Lenka has configured the logger to view messages for the Raw reason code Monitoring and Event Logging custom log flags for the Utilization Capability Object, she sees the detailed raw reason code change message in the SMC (including the information logged to the Production Database).
Scenario 4: Detect and Store Performance Events
   Specific Preconditions:
      1) An instance of the Utilization Capability Object is deployed and OnScan.
      2) Lenka has the Object Viewer open and the Utilization Capability Object instance selected.
   Basic Course:
      1) Based on a configured expression, the Utilization Capability Object detects that the machine raw reason code has changed, and an event is logged.
      2) Lenka verifies that a piece of equipment is in only one machine raw reason code at a time.
      3) Lenka verifies that any additional data values configured (such as work order, job, item, shift, or operation) is collected.
         a. If configured to do so, these additional data values that do not exist will be created in the Factelligence MES database.
      4) Lenka verifies that the machine raw reason code with the highest priority is recorded as the active machine raw reason code.
         a. If the current machine raw reason code cannot be determined, the default raw reason code will be recorded as "Unknown" or whatever Lenka configured the "Unknown" raw reason code to be.
   Specific Post Conditions:
      1) Event data stored can be retrieved within the Factelligence Database.
      2) Micro-Stop events will be detected and events will be logged accordingly.
      3) The Utilization Capability Object's data collection will also work in a store forward environment.
Scenario 5: Expose OEE Information with UCO
   Specific Preconditions:
      1) An instance of the Utilization Capability Object is deployed and OnScan.
      2) Lenka has the Object Viewer open and the Utilization Capability Object instance selected.
   Basic Course:
      1) Lenka verifies the Utilization Capability Object's attributes contain the performance data.
   Specific Post Conditions:
      1) None.
Scenario 6: Modify Utilization Object Configuration at Runtime
   Specific Preconditions:
      1) An instance of the Utilization Capability Object is deployed and OnScan.
      2) Lenka has the Object Viewer open and the Utilization Capability Object instance selected.
   Basic Course:
      1) Lenka is able to configure the Input Source of the Production Attributes specified in the Equipment Raw reason code Monitoring and Event Logging DFS.
      2) Lenka can configure whether the Utilization Capability Object should Resume on Error.
   Specific Post Conditions:
      1) Any changes to the Utilization Capability Object's runtime configuration can be verified.
Scenario 7 Trigger Raw Reason Code Event on Calendar Change
   Specific Preconditions:
      1) Trigger raw reason code event on calendar change event is configured.
   Basic Course:
      1) One or more calendar attribute changes.
         a. Production period
         b. Team
         c. Shift
      2) The ApplicationObject records a raw reason code event with the scan time of the ApplicationObject.
   Specific Post Conditions:
      1) A calendar change is logged as context with the raw reason code event.
      2) Calendar triggered events will not require acceptance.

In view of the many possible embodiments to which the principles of this invention may be applied, it should be recognized that the embodiments described herein with respect to the drawing figures are meant to be illustrative only and should not be taken as limiting the scope of the invention. Furthermore, the illustrative steps carried out by computer executable instructions provided on a tangible computer-readable medium, may be modified, supplemented and/or reordered without deviating from the invention. It is furthermore noted that the inventions disclosed herein are alternatively presentable as: computer systems executing software code to received data, methods, and computer-readable media (e.g., tangible computer-readable media) containing computer-executable instructions for carrying out the claimed invention. Therefore, the invention as described herein contemplates all such embodiments as may come within the scope of the following claims, alternative embodiments disclosed but not yet claimed, and all equivalents thereof to the fullest extent permitted.

What is claimed is:

1. A method of updating a manufacturing execution system (MES) database to include an MES entity corresponding to equipment modeled by a corresponding supervisory control and data acquisition (SCADA) system object, the method comprising:
   providing a utilization object associated with the SCADA system object, the utilization object having an executable that, when executed, applies collected status data for the SCADA system object to a set of configured logical expressions to render a current raw reason code for the utilization object;
   extracting MES entity configuration information from the utilization object;

invoking an interface functionality on the MES database to create the MES entity; and providing a link between the utilization object and the MES entity to facilitate updating the MES entity based upon an event triggered by a change to the current raw reason code for the utilization object; and wherein an entity model builder generates at least a second MES entity corresponding to a parent object of the SCADA system object.

2. The method of claim 1 wherein a hierarchical relationship between the parent object and the SCADA system object is maintained in the MES database.

3. The method of claim 1 wherein the entity model builder facilitates updating a set of MES entities, linked to corresponding SCADA system objects to synchronize the set of MES entities with changed configurable contents of the corresponding SCADA system objects.

4. The method of claim 1 wherein the MES entity configuration information includes performance targets.

5. The method of claim 1 wherein the MES entity configuration information includes production attributes configured in the utilization object.

6. The method of claim 1 wherein the MES entity configuration information includes production counters configured in the utilization object.

7. A method of updating a manufacturing execution system (MES) database including an MES entity corresponding to equipment modeled by a corresponding supervisory control and data acquisition (SCADA) system object, the method comprising:

providing a utilization object associated with the SCADA system object, the utilization object having an executable that, when executed, applies collected status data for the SCADA system object to a set of configured logical expressions to render a current raw reason code for the utilization object; and issuing to the MES database an update from the utilization object when a result of applying collected status data to the set of configured logical expressions indicates that the current raw reason code has changed to a new value;

wherein a duration is specified for a period of time for a first logical expression, for a first raw reason code, must continuously evaluate to a true state before the first raw reason code is registered as the current raw reason code; and wherein an activation time for the first raw reason code, upon completion of the period, is a point in time when the first logical expression became a highest priority true expression.

8. The method of claim 7 wherein the utilization object is an object facet comprising defined data fields and executable scripts for applying SCADA data, representing equipment operation status, to the set of configured logical expressions.

9. The method of claim 7 wherein the set of configured logical expressions are prioritized, and selection of the current raw reason code is based, at least in part, upon a priority assigned to raw reason codes having logical expressions that evaluate to true.

10. A method of updating a manufacturing execution system (MES) database to include an MES entity corresponding to equipment modeled by a corresponding supervisory control and data acquisition (SCADA) system object, the method comprising:

providing a utilization object associated with the SCADA system object, the utilization object having an executable that, when executed, applies collected status data for the SCADA system object to a set of configured logical expressions to render a current raw reason code for the utilization object;

extracting MES entity configuration information from the utilization object;

invoking an interface functionality on the MES database to create the MES entity;

providing a link between the utilization object and the MES entity to facilitate updating the MES entity based upon an event triggered by a change to the current raw reason code for the utilization object; and wherein the MES entity configuration information includes performance targets.

11. A method of updating a manufacturing execution system (MES) database to include an MES entity corresponding to equipment modeled by a corresponding supervisory control and data acquisition (SCADA) system object, the method comprising:

providing a utilization object associated with the SCADA system object, the utilization object having an executable that, when executed, applies collected status data for the SCADA system object to a set of configured logical expressions to render a current raw reason code for the utilization object;

extracting MES entity configuration information from the utilization object;

invoking an interface functionality on the MES database to create the MES entity;

providing a link between the utilization object and the MES entity to facilitate updating the MES entity based upon an event triggered by a change to the current raw reason code for the utilization object; and wherein the MES entity configuration information includes production counters configured in the utilization object.

* * * * *